(12) United States Patent
Sloan

(10) Patent No.: US 7,719,426 B2
(45) Date of Patent: May 18, 2010

(54) CORRECTIONAL SUPERVISION PROGRAM AND CARD

(75) Inventor: David Sloan, Phoenix, AZ (US)

(73) Assignee: WorldTron Group, Inc., Phoenix, AZ (US)

(*) Notice: Subject to any disclaimer, the term of this patent is extended or adjusted under 35 U.S.C. 154(b) by 0 days.

(21) Appl. No.: 11/452,473

(22) Filed: Jun. 13, 2006

(65) Prior Publication Data
US 2007/0013527 A1  Jan. 18, 2007

Related U.S. Application Data

(60) Provisional application No. 60/690,265, filed on Jun. 15, 2005.

(51) Int. Cl.
G08B 23/00 (2006.01)
(52) U.S. Cl. .................... 340/573.1; 379/189
(58) Field of Classification Search .......... 340/573.1; 379/114, 189, 198
See application file for complete search history.

(56) References Cited

U.S. PATENT DOCUMENTS

| | | | | |
|---|---|---|---|---|
| 5,907,602 | A * | 5/1999 | Peel et al. .......... | 379/114.14 |
| 6,360,209 | B1 | 3/2002 | Loeb et al. | |
| 7,072,864 | B2 | 7/2006 | Brake et al. | |
| 2002/0063153 | A1 | 5/2002 | Stack et al. | |
| 2002/0067272 | A1* | 6/2002 | Lemelson et al. ........ | 340/573.4 |
| 2002/0116324 | A1 | 8/2002 | Macias | |
| 2002/0194080 | A1 | 12/2002 | Lourie | |
| 2003/0158819 | A1* | 8/2003 | Scott .................... | 705/65 |
| 2004/0225545 | A1* | 11/2004 | Turner et al. .......... | 705/8 |
| 2005/0044021 | A1 | 2/2005 | Schafer | |
| 2005/0077350 | A1 | 4/2005 | Courtion et al. | |
| 2005/0177496 | A1 | 8/2005 | Blagg et al. | |
| 2005/0240527 | A1 | 10/2005 | Goldman | |
| 2006/0287917 | A1 | 12/2006 | Graham | |

OTHER PUBLICATIONS

International Search Report and Written Opinion, PCT/US06/23351, May 29, 2007, 10 pages.
Archive of Bankrate.com, "Baby-step Your Way to Credit with a Secured Credit Card," www.bankrate.com [online] [Archived by http://archive.org on Aug. 29, 2005; Retrieved on Apr. 23, 2008] Retrieved from the Internet<URL: http://web.archive.org/web/20050829132714/http://www.ba...com/brm/news/credit-management/secured-credit-cards.asp>.

(Continued)

*Primary Examiner*—Daniel Wu
*Assistant Examiner*—Shirley Lu
(74) *Attorney, Agent, or Firm*—Fenwick & West LLP

(57) ABSTRACT

Systems and methods provide management of a program of correctional supervision via a stored-value card. Through a stored-value card issued to a criminal offender in a program of correctional supervision, the offender's transactions are compared to a rule set for the program, and it is determined whether an alert condition has occurred as a result of the transaction. Monies owed by the criminal offender may be collected using the card and the stored-value card provides a criminal offender a card for purchases and other transactions usually unavailable to the unbanked.

19 Claims, 2 Drawing Sheets

OTHER PUBLICATIONS

Lindenmayer, I., "Prepaids Touted to Build History for Unbanked," American Banker Online, Jan. 13, 2005, [Retrieved on Jan. 13, 2005], Retrieved from the Internet<URL:http://www.americanbanker.com/article.html?id=20050112E69QAWD1&from=cards>.

PCT International Search Report and Written Opinion, PCT/US06/48116, Mar. 28, 2008, 11 pages.

"PlasticCASH MasterCard Card Agreement", PlasticCASH.com Website [online], 2003, 7 Pages, [Retrieved on Mar. 17, 2009] Retrieved from the Internet: <URL: http://web.archive.org/web/20040207130935/www.plasticcash.com/terms.htm>.

Questions and Answers, PlasticCASH.com Website [online], 2003, 6 Pages, [Retrieved on Mar. 17, 2009] Retrieved from the Internet: <URL: http://web.archive.org/web/20040207130503/www.plasticcash.com/questionsandanswers.htm>.

* cited by examiner

CORRECTIONAL SUPERVISION PROGRAM AND CARD

RELATED APPLICATIONS

This application claims the benefit of patent application Ser. No. 60/690,265, entitled "Credit Card for Use In the Corrections Industry," filed Jun. 15, 2005; this application also is related to U.S. patent application Ser. No. 11/388,812, entitled "Hybrid Card," filed Mar. 23, 2006, each of which are incorporated herein by reference.

BACKGROUND

1. Field of the Invention

The present invention relates generally to management of correctional supervision programs, and more specifically, to monitoring of criminal offenders in correctional supervision programs.

2. Description of the Related Art

Billions of dollars are spent annually on the world's prison systems. In addition to hard costs, much time and money are spent on tracking criminal offenders in programs of correctional supervision, such as probationers and parolees.

Several inefficiencies contribute to the costs associated with corrections programs, due in large part to the structure of correctional supervision. For example, parolees and probationers are monitored by corrections officers on an individual basis, using enforcement tactics that often are not effective, such as telephone calls to confirm an offenders' location. This monitoring requires extensive investigation and follow up, for example confirmation of employment on a regular basis.

In addition, the collection of monies owed by an offender, including supervisory fees, court-ordered fines, and/or restitution payments usually is the responsibility of the corrections officer. Thus, corrections officers must balance their time between their supervisory and collections roles, often leading to conflicts in management of their caseload.

In addition, the current system of monetary exchange between a correctional facility, a probationer or parolee, and/or a recipient of restitution is administratively costly to the correctional facility and forces the facility to assume the risk of check fraud resulting from keeping an inventory for paper checks. Further, often parolees and probationers are unbanked individuals, often as a result of their criminal record.

Therefore, there is a need for a method of correctional supervision that is less time consuming for corrections officers, allows for easier collection of monies owed by offenders, and is more cost effective for correctional facilities.

SUMMARY

In various embodiments, the present invention provides methods and systems for a program of correctional supervision via a stored-value card. Through a stored-value card issued to a criminal offender in a program of correctional supervision, the offender's transactions using the card are used to monitor whether the offender is adhering to the conditions of the program. The offender's transactions are compared to a rule set for the program of correctional supervision, and the system determines whether an alert condition has occurred as a result of the comparison. These aspects of the present invention allow the corrections officer to quickly and more easily monitor offenders under the officer's supervision.

The stored-value card also may be used to collect monies owed by the criminal offender, reducing the burden on corrections officers managing collection of these monies. The stored-value card saves the correctional facility the costs associated with paper checks, and the stored-value cards have no value until they are loaded, thus, the correctional facility assumes no risk in maintaining an inventory of cards.

The stored-value card also provides a criminal offender in a program of correctional supervision, who may otherwise be unbanked with a card that provides immediate fund access, is safer than cashing a check, and is cheaper than buying and mailing money orders, e.g., to pay bills and/or offender fees, fines and restitution while on probation or parole.

The description in the specification is not all inclusive and, in particular, many additional features will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

One skilled in the art will readily recognize from the following discussion that alternative embodiments of the structures and methods illustrated herein may be employed without departing from the principles of the invention described herein.

DETAILED DESCRIPTION OF THE EMBODIMENTS

The offender management program described herein applies to criminal offenders in a program of correctional supervision, for example parolees and probationers. Parole is a period of conditional supervised release following a prison term. Probation is a period of correctional supervision in the community in lieu of incarceration. This is the context in which the embodiments are described herein.

Figure 1:
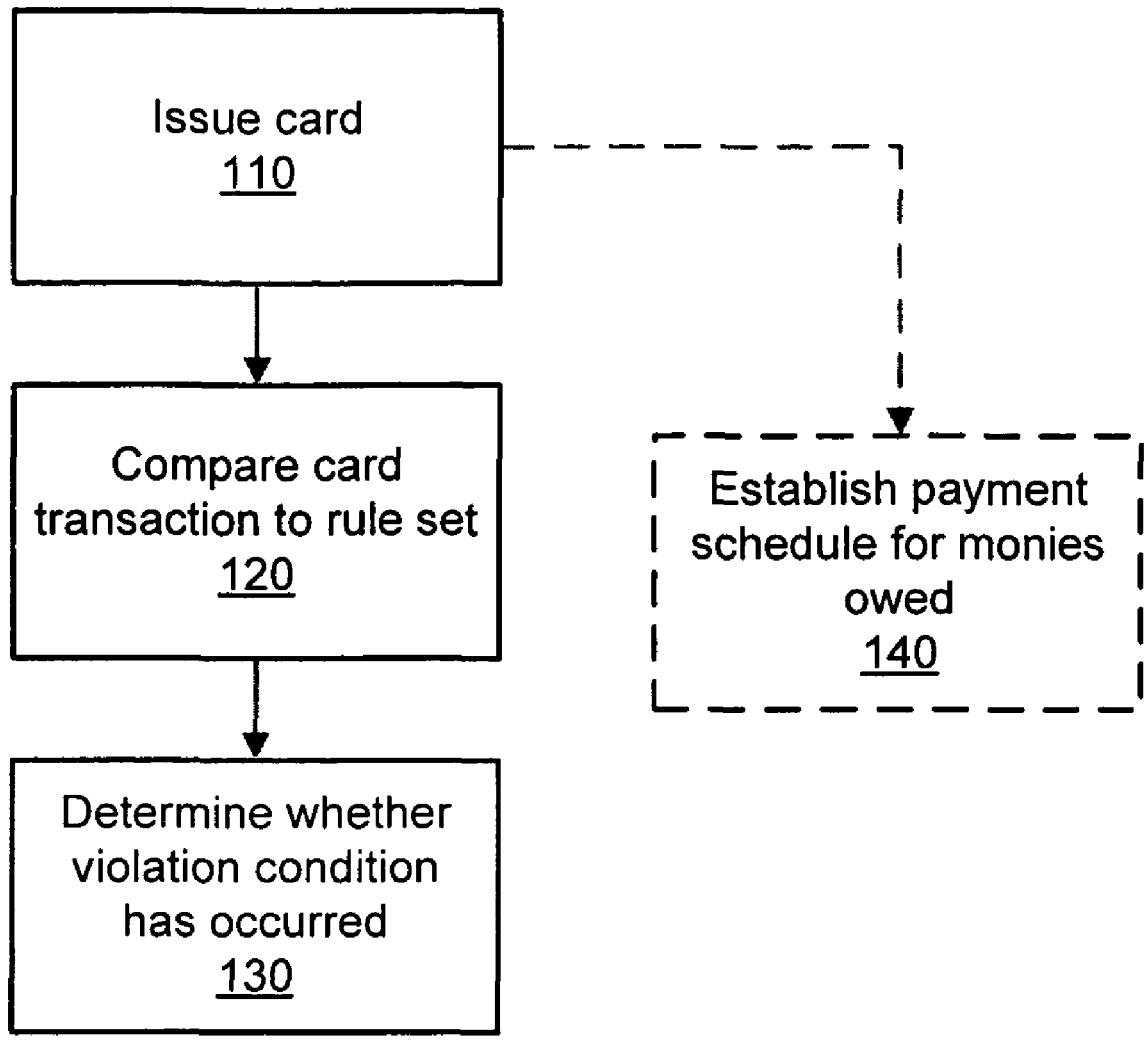
FIG. 1 is a flowchart illustrating a method of correctional supervision according to one embodiment of the present invention.

FIG. 1 is a flowchart illustrating a method of correctional supervision according to one embodiment of the present invention.

At the beginning of a period of correctional supervision, a criminal offender is issued 110 a stored-value card associated with the governing correctional institution according to one embodiment. A stored-value card is a magnetic-stripe plastic card that is issued by a bank. An account associated with the stored-value card ("card account") holds funds that are accessible using the stored-value card. In addition to making automated teller machines (ATM) withdrawals and purchases using the card, deposits may be made to, or "loaded," on the card, e.g., using an ATM, wire transfer, payroll direct deposit, or other reload location. Stored-value cards are characterized as "closed loop," meaning they are issued by and for use only at a particular merchant or merchant group, or "open loop," meaning they generally can be used anywhere credit or debit cards can be used. The stored-value card described herein is an open loop card according to one embodiment. Stored-value cards are similar to traditional credit and debit cards in that they allow the cardholder to purchase goods and services from personal identification number (PIN) based point of sale (POS) systems and participating on-line merchants, pay bills, and withdraw cash from ATMs. However, unlike traditional credit or debit cards, stored-value cards do not require an established positive credit history, the ability to open a bank account, or a balance in an existing bank account.

If the criminal offender is an inmate being released to parole, upon issuance 110 the inmate's funds, from the inmate's trust account and/or institutional funds (sometimes referred to as a "gratuity" or "gate money"), are electronically loaded to an assigned stored-value card as a substitute for receiving a check for these amounts according to one embodiment. In this example, upon release the correction facility provides the assigned stored-value card to the parolee. Since probationers are in a program of correctional supervision in lieu of being incarcerated, probationers are issued cards without funds loaded onto them.

An inventory of stored-value cards will be maintained at each correctional facility according to one embodiment. In this example, cards are loaded by the facility's accounting office using a single batch process equivalent to the process used for direct deposit. Unlike checks, stored-value cards have no value until they are loaded, thus, the correctional facility assumes no risk in maintaining an inventory of cards.

In addition to allowing the offender to make deposits and withdrawals at automated teller machines (ATMs), make purchases, and pay bills, the stored-value card also acts as a payroll card according to one embodiment, allowing employer deposit of payroll funds or government payment of recurring benefits such as social security or welfare. In addition, it allows deposits to the stored-value card account by correctional departments, e.g., loans made to the offender, and easy collection of repayment if repayment is appropriate. The card may have other features, such as acting as a calling card or having associated online resources, e.g., for housing, support groups, etc. The stored-value card may require direct deposit of payroll or government funds according to one embodiment.

The stored-value card may be upgraded to a hybrid card, as described in U.S. patent application Ser. No. 11/388,812, entitled "Hybrid Card," filed Mar. 23, 2006, which is incorporated herein by reference. The hybrid card is part of a program for extending and building credit. In one embodiment, the method provides a financial institution-issued hybrid card that has both credit and debit functionality. An account linked to the hybrid card includes available funds that provide security and a credit limit for extensions of credit. Available funds also are available for cash withdrawals and debit transactions. Due balances for credit purchases are paid in full and on time, by electronically debiting the linked account, resulting in positive credit information being reported to credit bureaus. The hybrid card allows the cardholder access to available funds at any time, provides a savings platform, and enables credit-building, but does not have the credit or income requirements or predetermined spending limits typically associated with traditional credit cards.

The stored-value card provides a criminal offender in a program of correctional supervision, who may otherwise be unbanked, with a card that provides immediate fund access, is safer than cashing a check, and is cheaper than buying and mailing money orders, e.g., to pay bills. The stored-value card saves the correctional facility the costs associated with paper checks, and allows tracking of the criminal offender as described herein.

Sometime after the card is issued 110, the criminal offender executes a card transaction. In response to the transaction, the parameters of the transaction are compared 120 to a rule set for the program of correctional supervision.

Offenders in a program of correctional supervision must agree to abide by certain conditions while on parole. Typical conditions include following all correctional officer instructions, abiding by all laws, securing and/or maintaining employment as a requirement, obtaining permission before changing jobs or residence, geographic limitations, avoiding alcohol or drug use, and paying any monies owed, such as monthly supervision fees, other fees, fines, or restitution payments ordered by the sentencing court. Thus, the rule set for the program of correctional supervision includes a test for violations of these conditions according to one embodiment. Additional rules apply in some embodiments.

Card transactions take place at various network information points, such as banks and retail stores. Transactions include purchases using the stored-value card, ATM withdrawals and deposits, and payroll or government benefits deposits according to one embodiment. For each card transaction, information is provided to a server by the transaction record at the associated network information point according to one embodiment. For example, a payroll direct deposit to the card provides information indicating parameters such as the amount of the deposit, the date and/or timestamp of the deposit, and the depositing employer. Another example is a cash withdrawal from an ATM, which provides information indicating parameters such as the location of the ATM, the time of the transaction, and the amount of the transaction. In some embodiments, the transaction provides only an alphanumeric code, which the server translates into the transaction data.

The information regarding each transaction is reported promptly to the server. According to one embodiment, the transaction data is stored, e.g., in database 225. The server compares 120 the parameters of the transaction to the rule set for the correctional supervision. From this information, the server determines 130 whether an alert condition has occurred for the rule set as a result of the transaction according to one embodiment.

Alert conditions include correctional supervision violations, and according to one embodiment, other notable transaction events. An example of a correctional supervision violation is use of the stored-value card, e.g., making a purchase, outside of a geographical area for a rule set that includes a geographical limitation as part of the program of correctional supervision. An example of a notable transaction event is a purchase made with the stored-value card at a liquor store for a rule set that includes a prohibition of alcohol and/or tobacco. Other correctional supervision violations include stored-value card and account usage that indicates that the rule set for the correctional supervision has been violated or may have been violated. A change of employment is an alert condition as a notable transaction event according to one embodiment; it is not a violation per se, but could be a violation, e.g., if the offender did not get permission from the corrections officer ahead of time and was required to do so. A change of employment includes termination, resignation, a change in hours, and similar changes. Thus, a change in either the frequency or amount of employment payments is a notable condition according to one embodiment. Use of the stored-value card during certain hours also may be an alert condition of the correctional supervision imposes a curfew according to one embodiment. Alert conditions provoke alerts to the corrections officer, e.g., in the form of red flag e-mail notices and desktop pop-ups in an offender management software interface according to one embodiment. These aspects of the present invention allow the corrections officer to quickly and more easily monitor offenders under the officer's supervision.

In addition, a corrections officer can quickly ascertain the location of an offender under correctional supervision by instructing the offender to make a transaction, e.g., a balance inquiry at the nearest ATM or a purchase at the nearest retail location. Confirmation of location data may be augmented according to one embodiment by video, e.g., video taken of the person making a transaction at an ATM or retail location with videotaping. This aspect of the present invention provides the parole or probation officer the ability to quickly and easily verify the physical location of a criminal offender in a program of correctional supervision.

In addition, a payment schedule is established 140 for payments from the stored-value card for monies owed by the offender according to one embodiment. The collection of monies owed by an offender, including supervisory fees, court-ordered fines, and/or restitution payments usually is the responsibility of the corrections officer. According to one embodiment, the corrections officer sets amounts and frequencies of payments to be made by the offender from the stored-value card, which are subsequently electronically debited from the offender's card account. For example, the corrections officer can set the debiting schedule to coincide with the offender's pay schedule, using the transaction information corresponding to payroll deposits.

In one embodiment, if a scheduled debit is unsuccessful due to insufficient funds on the stored-value card, the debit is adjusted to a lesser amount and a partial payment is collected if possible. In addition, any unpaid debit amount remaining is flagged such that the debit is prioritized for payment, or marked for payment priority, such that when funds are subsequently deposited to the stored-value card they are first used to pay the debit according to one embodiment. Payments from the stored-value card that include fines and restitution payments are separated from any fee payments and electronically disbursed to the appropriate parties according to one embodiment. This aspect of the present invention reduces the burden on corrections officers managing collection of monies owed by offenders, increases amount collected, and provides for easier disbursement of monies, e.g., restitution.

In one embodiment, the system analyzes the stored transaction data for various purposes. Correctional facilities may use this information to adjust their operating procedures to further streamline and otherwise improve correctional supervision policies and practices. For example, the stored transaction data can be used to determine an optimum payment schedule for probations and parolees using information indicating that particular schedules were more or less effective in consistently collecting monies owed. Similarly, optimum recurring payment amounts can be determined using the stored transaction data based upon data gathered from multiple offenders' transactions. In other embodiments, other analyses and uses of the transaction data are possible.

System

Figure 2:
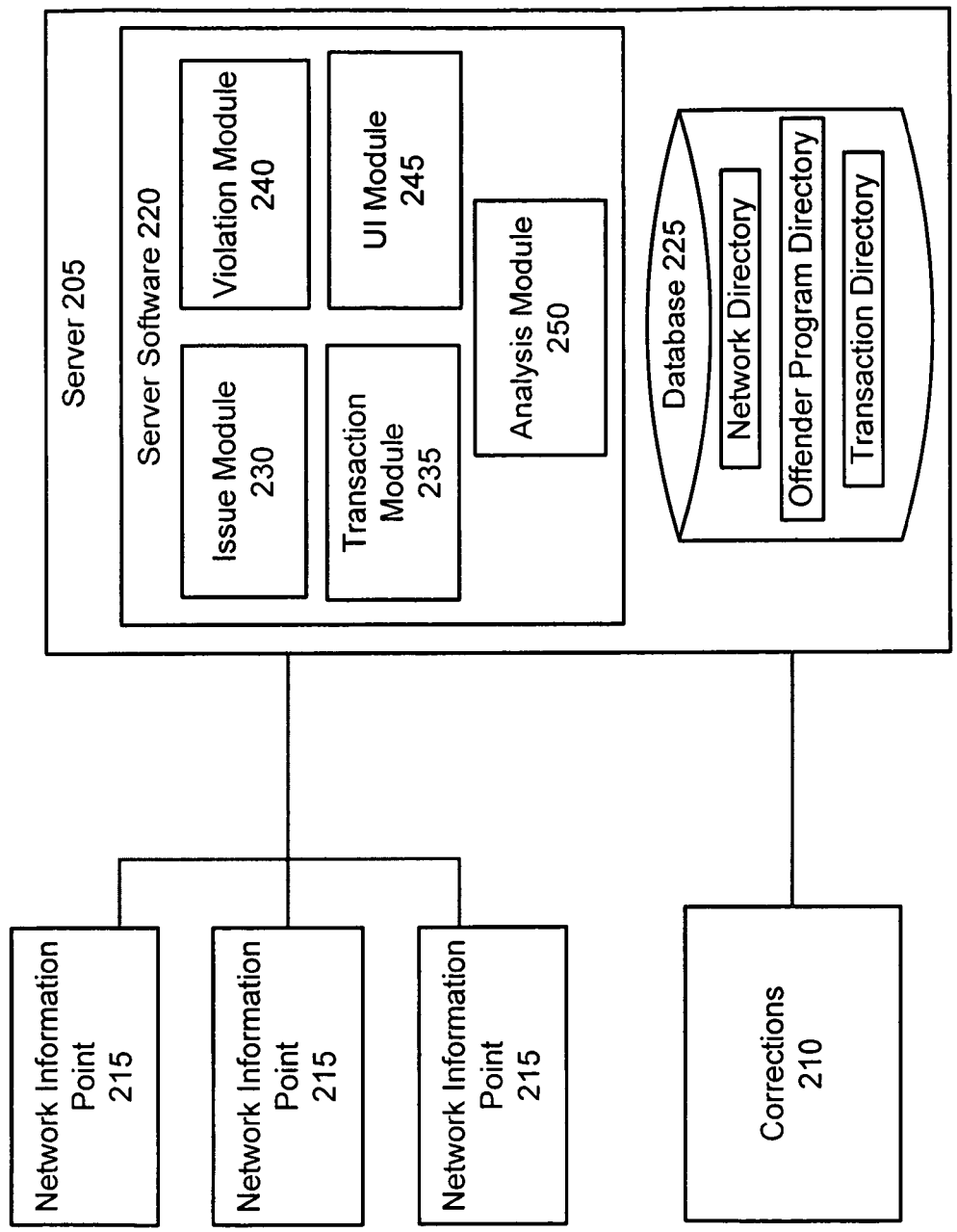
FIG. 2 illustrates the relationship between various entities involved in a offender management program in accordance with one embodiment of the present invention.

FIG. 2 illustrates the relationship between various entities involved in a offender management program in accordance with one embodiment of the present invention.

The server 205 is a computer or device of conventional design, which sends and receives information using well known network protocols, such as TCP/IP and HTTP, for communication across a network. In one implementation, the system operates on high performance server class computers. The details of the hardware aspects of server computers is well known to those of skill in the art and is not further described here.

The server 205 acts as a central hub for gathering and accessing the information associated with the method of correctional supervision described herein according to one embodiment. The server 205 is hosted by a corrections facility according to one embodiment. A financial institution, e.g., one of the network information points 215, hosts the server 205 according to another embodiment. In yet another embodiment, the server 205 is not hosted by the entities 205-215 described herein.

The corrections entity 210 is the corrections facility's and/or corrections officer's connection to the server 205 according to various embodiments. The corrections entity 210 provides to the server 205 the rule set for the program of correctional supervision as described herein according to one embodiment. The corrections entity 210 accesses the data in the server 205 via a user interface enabled by the user interface module 245 according to one embodiment.

The corrections entity 210 connects to the server 205 using a computer of conventional design according to one embodiment, and including a processor, an addressable memory, and other conventional features such as a display, local memory, input/output ports, and a network interface. A network interface and a network communication protocol provide access to a network and other computers according to one embodiment, along with access to the Internet, via a TCP/IP type connection, or to other network embodiments, such as a LAN, a WAN, a MAN, a wired or wireless network, a private network, a virtual private network, via other networks, or other systems allowing for data communication between two or more computing systems.

The network information points 215 are points at which transactions associated with one or more stored-value card(s) take place according to one embodiment, as described herein. Network information points 215 include banks and retail stores according to one embodiment. For each card transaction, the network information points 215 provide a transaction record to the server 205 according to one embodiment.

The server 205 includes server software 220 and a database 225 according to one embodiment. The server software 220 is comprised of a number of executable code portions and data files. These include code for facilitating method of correctional supervision according to one embodiment, as described wherein. In other embodiments, the server software 220 can be implemented as a stand-alone application outside of the server 205.

The server software 220 is responsible for orchestrating the processes performed according to the methods of the present invention. The server software 220 includes an issue module 230, a transaction module 235, a violation module 240, a user interface module 245, and an analysis module 250 according to one embodiment.

The issue module 230 enables issuance of a stored-value card associated with a governing correctional institution to an offender in a program of correctional supervision according to one embodiment, and is one means for so doing. The issue module 230 facilitates the transfer of inmate funds from the inmate's trust account and/or institutional funds to the card account according to one embodiment.

The transaction module 235 enables comparison of the parameters of transactions to a rule set for the program of correctional supervision stored in the database 225 as described herein according to one embodiment, and is one means for so doing. The rule set includes typical parole and/or probation conditions according to various embodiments.

Additional or other rules separate from the conditions apply in some embodiments. The transaction module 235 takes transaction information received from network information point associated with a transaction, and compares the data to a rule set according to one embodiment.

The violation module 240 enables a determination of whether an alert condition has occurred for the rule set as a result of the transaction according to one embodiment, and is one means for so doing. The violation module 240 considers alert conditions, e.g., correctional supervision violations and other notable changes according to one embodiment, and provides an alert to the corrections officer. In one embodiment, the alerts are provided via a user interface as described herein. In another embodiment, the alerts are provided by email.

The user interface module 245 provides a user interface for monitoring a criminal offender's transactions and for receiving alerts according to one embodiment, and is one means for so doing. According to one embodiment, the user interface module 245 also facilitates establishing the rule set for the correctional supervision program. According to another embodiment, the rule set is established by the corrections facility prior to card issuance and is uploaded into the system for monitoring, A payment schedule is established by way of the user interface module 245 according to one embodiment, For example, a corrections officer can establish via a user interface a schedule for supervision payments that coincides with the offender's payroll direct deposit schedule. The user interface module 245 enables additional features associated with the stored-value card and program of correctional supervision according to one embodiment, e.g., allowing a corrections officer to view video of a person using an offenders stored-value card at an ATM.

The analysis module 250 provides for analysis of stored transaction data according to one embodiment, and is one means for so doing. In one embodiment, the analysis module 250 analyzes the stored transaction data to reveal possible ways to improve correctional supervision policies and practices.

The above software portions 230-250 need not be discrete software modules. The software configuration shown is meant only by way of example; other configurations are contemplated by and within the scope of the present invention.

The database 225 may be a relational database or any other type of database that stores the data used by the server software 220, for example data corresponding to an offender program, including a rule set as referenced herein. According to one embodiment, the database 225 includes a network directory corresponding to the various network information points 215, an offender program directory corresponding to rule sets for the various offenders in correctional supervision programs, and a transaction directory corresponding to the stored transaction data, as depicted in FIG. 2. The database 225 may be accessible by the server software application 220 through a user interface controlled by the user interface module 245. The server software 220 and the database 225 may be stored and operated on a single computer or on separate computer systems communicating with each other through a network.

One skilled in the art will recognize that the system architecture illustrated in FIG. 2 is merely exemplary, and that the invention may be practiced and implemented using many other architectures and environments.

Example

A stored-value card is issued to an inmate being released to parole from a correctional facility. Inmate funds are loaded to the account associated with the stored-value card prior to issuance. The parolee can immediately begin using the card, for example, by going to the nearest ATM and withdrawing cash to use as sending money. The ATM is an example of a network information point as described herein. As a result, the transaction has an associated location code and time stamp, which is sent to the server.

The parolee has parole conditions that are set up in the server as a rule set for the correctional supervision. In this example, the rule set includes securing and maintaining employment. If the parolee has a change in employment, the corrections officer is to be notified before the change or immediately after the change.

Via a user interface to the server data, a corrections officer monitors the transactions of various criminal offenders in correctional supervision. A week before the parolee in this example is to have a paycheck for $675 direct deposited to his card account, a payroll direct deposit comes through for $245 from his employer. The system compares this transaction to the rule set, which includes maintaining employment, and an alert condition is noted. The server sends the alert to the corrections officer, for example via an email alert.

The officer examines the alert, in which the parolee was paid less and ahead of schedule, which may imply that the parolee's employment has terminated. As a result, the corrections officer is alerted that he should make contact with the parolee to confirm whether a parolee condition violation has occurred. If the corrections officer believes that the parolee has skipped town, he may request that the parolee go to his nearest ATM to register a transaction. Thus, the corrections officer has easy access to violations and potential violations of the parolee's correctional supervision.

The present invention has been described in particular detail with respect to one possible embodiment. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method of correctional supervision, comprising:
   using a computer to perform steps comprising:
      issuing a stored-value card to a criminal offender in a program of correctional supervision, the program of correctional supervision having as a condition the criminal offender abiding by a rule set for the program of correctional supervision, the rule set comprising an employment requirement;
      analyzing transaction activity involving the stored-value card, the analysis comprising comparing parameters of transactions to the rule set for the program of correctional supervision; and
      in response to the comparison, determining whether the transaction parameters trigger an alert condition corresponding to the employment requirement in the rule set, wherein the alert condition corresponding to the rule set is at least one selected from the group consisting of a change in employment status and a change in employment income.

2. The method of claim 1, wherein the criminal offender is a parolee or probationer and the rule set for the program of correctional supervision is governed by a set of parole or probation conditions.

3. A computer-implemented method of correctional supervision, comprising:
   using a computer to perform steps comprising:
      electronically depositing to an account associated with a stored-value card funds from an inmate trust account associated with a criminal offender;
      issuing the stored-value card including the funds to the criminal offender in a program of correctional supervision, the program of correctional supervision having as a condition the criminal offender abiding by a rule set for the program of correctional supervision, the rule set comprising an employment requirement;
      analyzing transaction activity involving the stored-value card, the analysis comprising comparing parameters of transactions to the rule set for the program of correctional supervision to determine criminal offender conformance with the employment requirement; and
      in response to the comparison, determining whether the transaction parameters trigger an alert condition corresponding to the rule set, wherein the alert condition indicates suspected nonconformance with the employment requirement.

4. The method of claim 3, wherein the criminal offender is a parolee or probationer and the rule set for the program of correctional supervision is governed by a set of parole or probation conditions.

5. The method of claim 1, wherein the parameters of the transactions include a location code and determining whether the transaction parameters trigger an alert condition comprises comparison of the location code to geographic limitations corresponding to the rule set.

6. The method of claim 1, wherein the parameters of the transactions include a timestamp and determining whether the transaction parameters trigger an alert condition comprises comparison of the timestamp to a curfew corresponding to the rule set.

7. The method of claim 1, wherein the parameters are received from a network information point.

8. The method of claim 1, wherein the rule set comprises paying monies owed and non-payment by a due date comprises an alert condition.

9. The method of claim 1, further comprising establishing a schedule of payments from the stored-value card for monies owed by the criminal offender, wherein the schedule of payments coordinate with a payroll direct deposit schedule for the criminal offender.

10. The method of claim 1, wherein comparing parameters of transactions comprises comparing parameters of a payroll direct deposit transaction to the rule set.

11. The method of claim 1, further comprising, in response to insufficient funds for a payment for monies owed, marking the insufficient funds for payment priority.

12. The method of claim 1, wherein the stored-value card is a hybrid card.

13. The method of claim 1, further comprising analyzing stored transaction data for optimizing payment of monies owed by the offender.

14. A computer-readable storage medium storing executable computer program code for a program of correctional supervision, comprising:

> issuing a stored-value card to a criminal offender in a program of correctional supervision, the program of correctional supervision having as a condition the criminal offender abiding by a rule set for the program of correctional supervision, the rule set comprising an employment requirement;
>
> analyzing transaction activity involving the stored-value card, the analysis comprising comparing parameters of the transactions to the rule set for the program of correctional supervision; and
>
> in response to the comparison, determining whether the transaction parameters trigger an alert condition corresponding to the employment requirement in the rule set, wherein the alert condition corresponding to the rule set is at least one selected from the group consisting of a change in employment status and a change in employment income.

15. The computer-readable storage medium of claim 14, wherein the parameters are received from a network information point.

16. The computer-readable storage medium of claim 14 further comprising computer program code for analyzing stored transaction data for optimizing payment of monies owed by the offender.

17. A system for a program of correctional supervision, comprising:

> a computer-readable storage medium storing executable computer program code comprising:
>
>> an issue module for issuing a stored-value card to a criminal offender in a program of correctional supervision, the program of correctional supervision having as a condition the criminal offender abiding by a rule set for the program of correctional supervision, the rule set comprising an employment requirement;
>>
>> a transaction module for analyzing transaction activity involving the stored-value card, the analysis comprising comparing parameters of transactions to the rule set for the program of correctional supervision; and
>>
>> a violation module for determining whether the transaction parameters trigger an alert condition corresponding to the employment requirement in the rule set responsive to the comparison, wherein the alert condition corresponding to the rule set is at least one selected from the group consisting of a change in employment status and a change in employment income.

18. The system of claim 17, wherein the parameters are received from a network information point.

19. The system of claim 17, further comprising an analysis module for analyzing stored transaction data for optimizing payment of monies owed by the offender.

\* \* \* \* \*

UNITED STATES PATENT AND TRADEMARK OFFICE
CERTIFICATE OF CORRECTION

PATENT NO. : 7,719,426 B2 Page 1 of 1
APPLICATION NO. : 11/452473
DATED : May 18, 2010
INVENTOR(S) : David Sloan It is certified that error appears in the above-identified patent and that said Letters Patent is hereby corrected as shown below:

Column 11, line 23, Claim 14, delete "the" before "transactions".

Signed and Sealed this

Twenty-seventh Day of July, 2010

David J. Kappos
*Director of the United States Patent and Trademark Office*